R. SERA.
BEAN HARVESTING MACHINE.
APPLICATION FILED NOV. 27, 1917.
1,339,674.
Patented May 11, 1920.
2 SHEETS—SHEET 1.
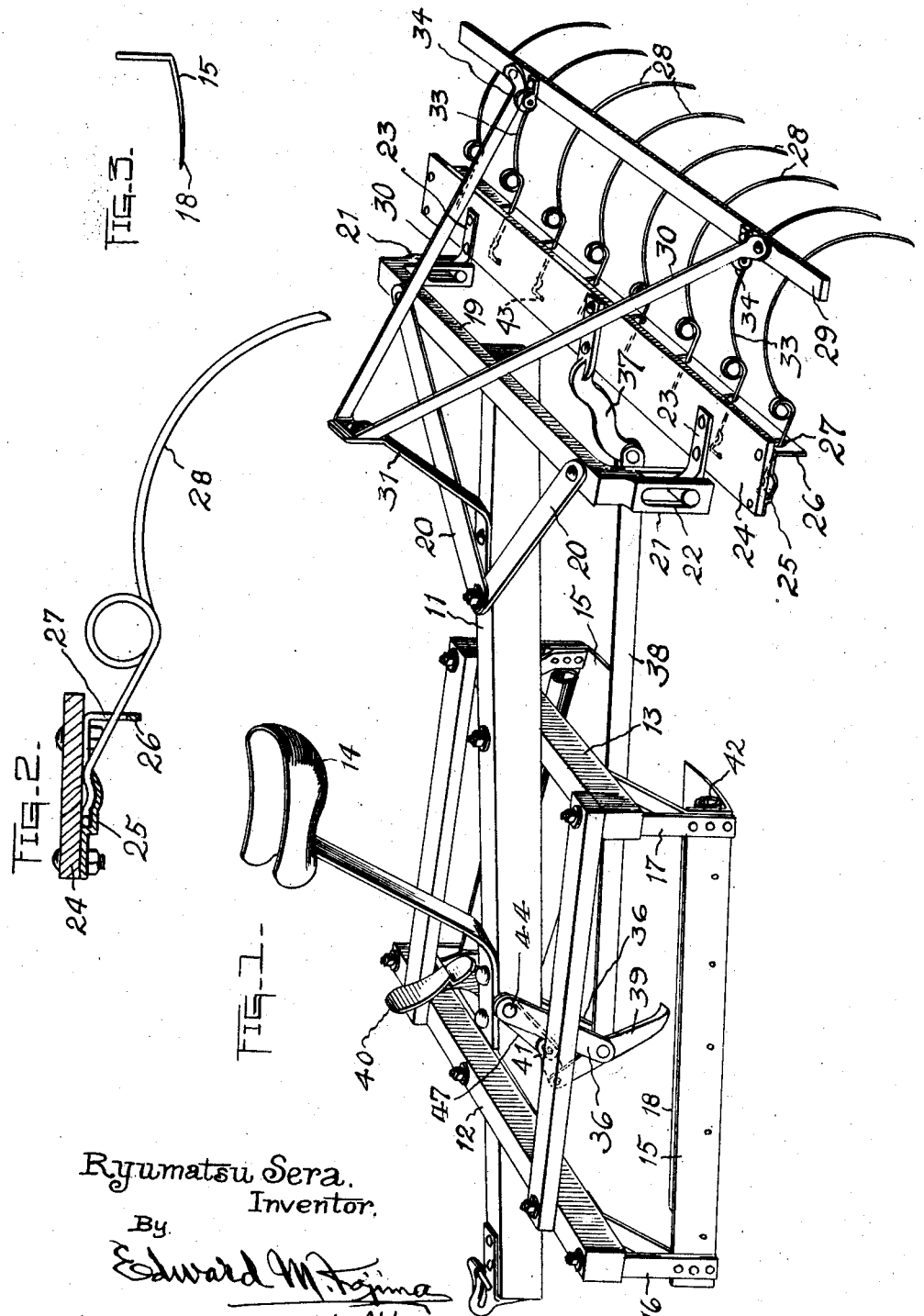
Ryumatsu Sera,
Inventor.
By
Edward M. Fujima
His Atty.

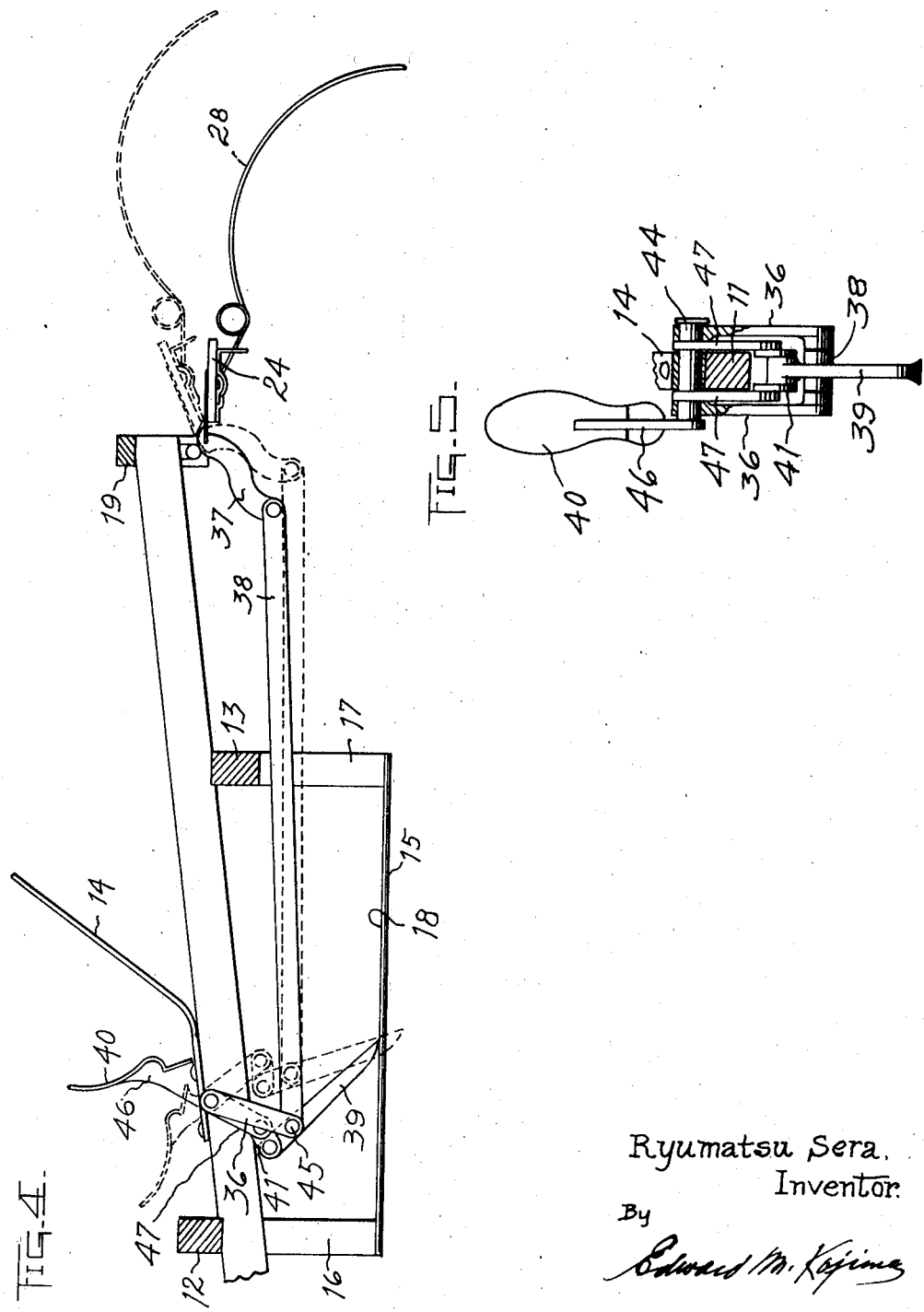

UNITED STATES PATENT OFFICE.

RYUMATSU SERA, OF BANNING, CALIFORNIA.

BEAN-HARVESTING MACHINE.

1,339,674.   Specification of Letters Patent.   Patented May 11, 1920.

Application filed November 27, 1917. Serial No. 204,145.

*To all whom it may concern:*

Be it known that I, RYUMATSU SERA, a subject of the Emperor of Japan, residing at Banning, in the county of Riverside and State of California, have invented certain new and useful Improvements in Bean-Harvesting Machines, of which the following is a specification.

This invention relates to an improved harvester particularly adapted for harvesting beans and similar crops, the vines of which are matted in such a manner that they may not be successfully gathered by ordinary harvesting machines, this invention having particular reference to the bunching mechanism and operating means therefor.

The objects of this invention are to provide a device of this class which is durable, of simple construction, efficient in operation, and capable of cutting simultaneously two rows of beans or similar crops, and gathering the same into convenient piles.

With these ends in view the invention consists in the improved construction, combination, and arrangement of parts as hereinafter more fully described and defined in the appended claims, the right being reserved to minor changes, alterations, and modifications falling within the scope thereof.

Upon the annexed drawings, Figure 1 is a perspective view of a bean harvester made in accordance with the invention. Fig. 2 is a sectional detail view of the rake bar. Fig. 3 is a detail end view of the cutter knife. Fig. 4 is a diagram showing the operative mechanism for dumping the rake; the raking position being shown by full lines, and the dumping position by dotted lines. Fig 5 is a transverse sectional detail view of the tripping mechanism.

The inclined main beam 11 is secured to transverse beams 12 and 13, an operator's seat 14 being secured to the main beam. Depending brackets 16 and 17, secured, respectively, to beams 12 and 13, carry knives 15, converging at the rear, and provided with inwardly projecting and opposed cutting edges 18, and bars 42 which serve to turn the severed vines inward and thereby prevent clogging of the knives. A yoke 19, secured to beam 11, and supported by braces 20, has forked ends 21, provided with slots 22, which allow a vertical movement of the raking means as hereinafter described.

The raking or bunching mechanism embodies a rake-head 24 which extends transversely at the rear of the main frame and is provided with hangers 23, pivotally and slidably mounted in stirrups 21; the rake-head 24 further embodying a clamp member 25 having a depending flange 26 pierced with slots 27. Rake teeth 28, 33, provided with angularly bent ends 43, are secured by clamp 25, and extend through slots 27. A transversely disposed and yieldingly mounted packing-bar 29 extends over the rake teeth, and as the rake fills with vines, serves to maintain the rake teeth in operative engagement with the ground, and prevents the accumulating bunch of vines from passing through and between the teeth; the packing-bar 29 further serving as a stripper during the upward movement of the rake-teeth. When the raking mechanism is actuated to deposit the bunched vines, rake teeth 33 ride upon grooved rollers 34 mounted on the packing-bar 29. The resilient spring standard 31 and resilient rods 30, are arranged to yieldingly support the packing-bar 29.

As herein disclosed, the operative means for actuating the rake comprises links 36, pivotally mounted on shaft 44, journaled in main beam 11, a rock-arm 37 fixed to rake-head 24, a connecting rod 38 between the rock-arm 37 and links 36, a tripping prong 39 pivotally connected to the swinging end 45, of links 36, lever 46, fixed to shaft 44, and provided with a pedal 40, an arm 47 fixed to shaft 44, and link 41 connecting arm 47 and tripping prong 39, as is believed to be clearly shown in the drawings.

This harvester is adapted to be hauled astride of two adjacent rows of beans, and while traveling in a forward direction, the inclosed rows of vines are turned inwardly, their roots being severed by the cutters, and the vines of the separate rows are gathered together beneath the center of the harvester.

To actuate the rake mechanism for release of the accumulated vines, lever 46 is rocked in a forward direction, and the arm 47 having synchronous movement, will, through link 41, actuate the tripping prong 39 to a forwardly inclined position for engagement with the ground. The continued forward movement of the harvester relative to the ground, will cause links 36 to swing relatively rearward, and through rod 38 and rock-arm 37, will serve to tilt the rake to discharging position. As the rake teeth approach the uppermost discharging position, links 36 will be inclined to the rear sufficiently to disengage the tripping prong 39, whereupon, the rake and its actuating mechanism will return to the position shown in Fig. 1, the rake being assisted by gravity and the pressure of the packing-bar 29, to assume its normal position. The seat 14 is mounted in position to permit convenient operation of lever 46 with the foot. Lever 46 is actuated sufficiently to place the tripping prong 39 in operative position, and the operation of the rake is then automatically effected by the forward movement of the harvester. As the vines are bunched beneath the rake teeth, the rake-head 24 will gradually rise in position, the slots 22 in which the rake-head hangers are mounted, permitting this vertical movement. The rake actuating mechanism is intermittently actuated during the use of the harvester.

The forward movement of pedal 40, serves to lift the rake teeth sufficiently for dumping, without forward movement of the machine. In Fig. 4, the tilting prong is shown extending below the surface of the ground. This would occur if the machine were not in motion and the ground not firm upon the surface. Forward motion of the machine, during manipulation of the pedal, would serve to lift the rake teeth higher.

What is claimed is:

1. In a bean harvester, a longitudinal main beam, a yoke at the rear end of the main beam, said yoke having slotted ends, a rake-head, hangers fixed thereto and journaled in said slotted ends, links pivotally mounted at the opposite end of the main beam, an arm fixed to the rake-head, a rod connecting the links and arm, a tripping prong pivotally connected to the swinging ends of the links, an actuating lever adapted for movement by the foot, an arm movable synchronously with the actuating lever, and a link connecting the last-named arm and the tripping prong to place the tripping prong in operative engagement with the ground upon movement of the actuating lever.

2. In a bean harvester, the combination with a rake-head and rake teeth secured thereto, of a main beam, actuating means pivotally secured thereto and normally swinging to a forwardly inclined position in the operative position of the rake-teeth, connecting means between the actuating means and the rake-head, and foot operated means to place the actuating means in position to be operated by the forward movement of the harvester.

3. In combination, a rake-head and rake-teeth secured thereto, a longitudinal frame beam, a shaft journaled in the frame beam, a lever integral therewith and adapted to be actuated by the foot, an arm integral with the shaft and moving synchronously with the foot actuated lever, a tripping prong pivotally connected to the swinging ends of the links, an arm fixed to the rake-head, a rod connecting the last-named arm and the swinging links, and a link connecting the first-named arm and the tripping-prong, all operative upon actuation of the operating lever to tilt the rake-teeth to the discharging position, and returning by gravity to the rake-operating position.

4. In combination, a rake-head and rake-teeth secured thereto, a main beam, a yoke at the rear end of the beam, a pivotal connection between the rake-head and yoke, means for tilting the rake-head and rake-teeth to the discharging position, a resilient standard projecting upward from the main beam, diverging rods extending rearward from the standard, and a transversely disposed packing-bar supported by said diverging rods and pressing yieldingly against the rake-teeth, said packing-bar serving as a stripper during the tilting movement of the rake-teeth.

5. In combination, a rake-head 24 and rake-teeth 33 secured thereto, a main beam 11, a yoke 19 fixed thereto and pivotally connected with the rake-head, a shaft 44 mounted in beam 11, a lever 46 fixed to shaft 44, an arm fixed to shaft 44, a link stirrup 36 pivotally mounted on shaft 44 and adapted for independent movement, a tripping prong 39 connected pivotally with link stirrup 36, a link 41 connecting tripping prong 39 and arm 47 for reversing the position of prong 39 upon actuating of lever 46, an arm 37 fixed to the rake-head, and a rod 38 connecting the arm 37 and link stirrup 36, whereby the rake-teeth are operated with a tilting movement upon engagement of prong 39 with the ground and relatively forward movement of the main beam.

6. The combination with a main beam and a yoke at the rear thereof, of a rake-head pivotally connected to the yoke, rake-teeth fixed to the rake-head, operating means pivotally mounted on the main beam, connecting means between the rake-head and operating means, a tripping prong adapted to engage with the ground and to actuate the operating means, and normally inclined rearward relative to the operating means, means to place the tripping prong in the operative position, and a transverse bar pressing yieldingly against the rake-teeth, said bar serving as a packer when the rake-teeth are in raking position, and as a stripper when the rake-teeth are tilted to discharge position.

7. In a bean harvester, a main frame, a yoke at the rear and integral therewith, a rake-head having a pivotal connection with the yoke and capable of vertical movement, rake-teeth fixed to the rake-head, a shaft journaled in the frame, an actuating member fixed to said shaft, an arm fixed to said shaft, an independent link-stirrup pivotally mounted on said shaft, a tripping prong pivotally mounted on the free end of the link-stirrup, a rock-arm fixed to the rake-head, a rod connecting the rock-arm and link-stirrup, connecting means between the actuating arm and tripping-prong to force the prong into engagement with the ground, a resilient standard at the rear of the main frame, and a packing-bar supported thereby and in engagement with the rake-teeth, said packing-bar serving as a stripper when the rake-teeth are tilted to the discharge position.

In testimony whereof I hereunto affix my signature this 21st day of November, 1917.

RYUMATSU SERA.

Witnesses:
J. E. MASTED,
S. HATAYE.